US008927904B2

(12) United States Patent
Ogborn et al.

(10) Patent No.: US 8,927,904 B2
(45) Date of Patent: *Jan. 6, 2015

(54) METHOD OF RATING A STICK ELECTRODE

(71) Applicant: Lincoln Global, Inc., City of Industry, CA (US)

(72) Inventors: Jonathan Sterling Ogborn, Concord Township, OH (US); Robert J. Weaver, Concord, OH (US); Jon P. Chiappone, Willoughby, OH (US); Craig B. Dallam, University Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/852,336

(22) Filed: Mar. 28, 2013

(65) Prior Publication Data
US 2013/0213947 A1   Aug. 22, 2013

Related U.S. Application Data

(63) Continuation of application No. 13/244,976, filed on Sep. 26, 2011, now Pat. No. 8,624,160, and a continuation of application No. 11/879,564, filed on Jul. 18, 2007, now Pat. No. 8,049,141.

(51) Int. Cl.
| B23K 9/00 | (2006.01) |
| B23K 33/00 | (2006.01) |
| B23K 35/30 | (2006.01) |
| B23K 9/10 | (2006.01) |
| B23K 9/12 | (2006.01) |
| B23K 9/06 | (2006.01) |
| B23K 9/095 | (2006.01) |
| B23K 9/24 | (2006.01) |
| B23K 31/12 | (2006.01) |
| B23K 35/40 | (2006.01) |

(52) U.S. Cl.
CPC .............. *B23K 9/1012* (2013.01); *B23K 9/095* (2013.01); *B23K 9/10* (2013.01); *B23K 9/24* (2013.01); *B23K 31/12* (2013.01); *B23K 35/406* (2013.01)
USPC ................ 219/137 R; 219/130.01; 219/130.4

(58) Field of Classification Search
CPC .... B23K 9/0956; B23K 9/0673; B23K 9/092; B23K 9/23; B23K 33/004; B23K 35/0261; B23K 35/0205; B23K 35/368; B23K 35/365; B23K 35/3053; B23K 35/222; B23K 35/302; B23K 35/308; B23K 35/3086; B23K 35/327; B23K 35/3605; H01L 24/78; H01L 24/85; H02H 1/0015; G01R 31/44; G01R 31/3278; G01R 31/006; G01R 31/02; G01R 27/205
USPC ................ 219/130.4, 130.01, 137 R, 137 PS, 219/137 WM, 145.1–146.52; 228/102–104; 324/536, 415–423
See application file for complete search history.

(56) References Cited

U.S. PATENT DOCUMENTS 3,542,998 A * 11/1970 De Huff ................... 219/146.52
4,302,655 A * 11/1981 Edling ..................... 219/130.32

(Continued)

*Primary Examiner* — Henry Yuen
*Assistant Examiner* — Hemant Mathew
(74) *Attorney, Agent, or Firm* — Hahn Loeser & Parks LLP; Brendan E. Clark

(57) ABSTRACT

A system and method of rating the arc maintainability of an electric arc welding stick electrode by creating an arc between the electrode and a workpiece; moving the electrode along the workpiece while maintaining the arc; decreasing either the current or the voltage until a point is reached where the arc is extinguished; determining the open circuit voltage at the point; and, rating the electrode based upon at least the open circuit voltage point.

16 Claims, 8 Drawing Sheets

(56) References Cited

U.S. PATENT DOCUMENTS

| | | | |
|---|---|---|---|
| 5,684,405 A * | 11/1997 | Rhein | 324/551 |
| 6,031,203 A * | 2/2000 | Suzuki et al. | 219/130.01 |
| 6,703,585 B2 * | 3/2004 | Suzuki | 219/130.01 |
| 7,642,486 B2 * | 1/2010 | Fosbinder et al. | 219/130.5 |
| 8,049,141 B2 * | 11/2011 | Ogborn et al. | 219/137 R |
| 2002/0170899 A1 * | 11/2002 | Suzuki | 219/130.01 |
| 2003/0052107 A1 * | 3/2003 | Suzuki | 219/130.01 |
| 2003/0155337 A1 * | 8/2003 | Rice et al. | 219/130.21 |
| 2005/0242076 A1 * | 11/2005 | Stava et al. | 219/130.5 |
| 2006/0076330 A1 * | 4/2006 | Beistle et al. | 219/130.4 |
| 2006/0086706 A1 * | 4/2006 | Ulrich | 219/132 |
| 2006/0231539 A1 * | 10/2006 | Katiyar et al. | 219/137 R |

* cited by examiner

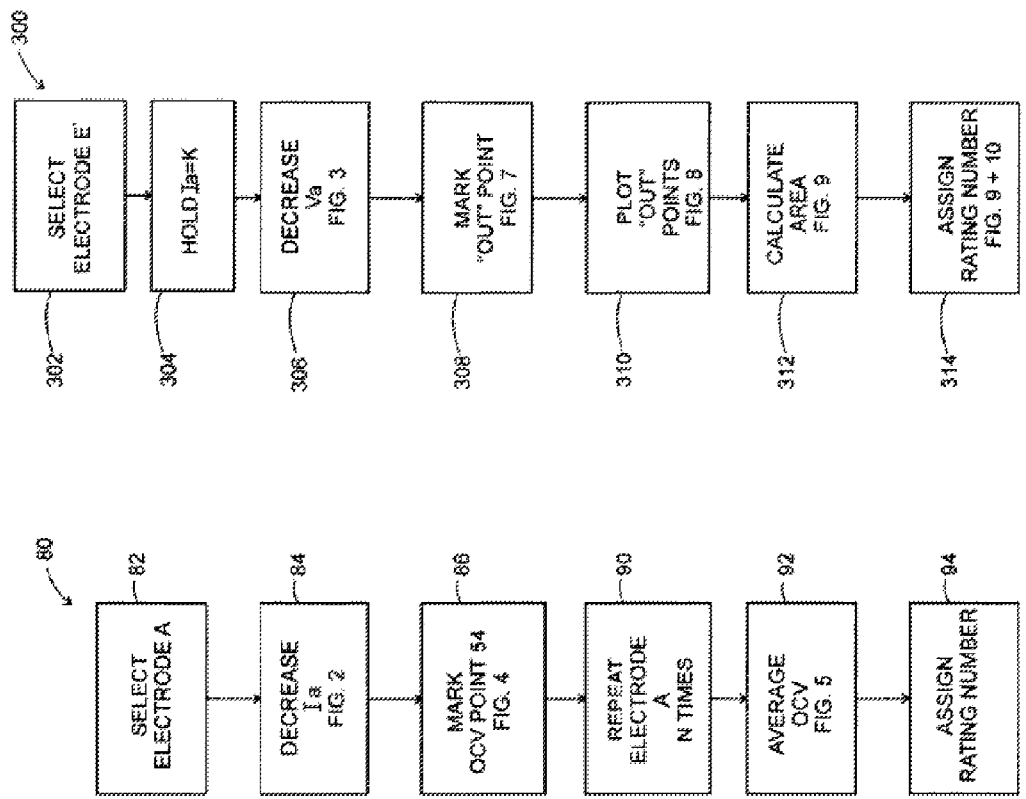

8,927,904 B2

METHOD OF RATING A STICK ELECTRODE

CROSS-REFERENCE TO RELATED APPLICATION

This application is a continuation of U.S. patent application Ser. No. 13/244,976 filed Sep. 26, 2011, which is in turn a continuation of U.S. patent application Ser. No. 11/879,564 filed Jul. 18, 2007 (now U.S. Pat. No. 8,049,141, issued Oct. 12, 2011), the disclosures of which are incorporated herein by reference.

BACKGROUND

1. Technical Field

The subject matter discussed herein relates to the art of testing a stick electrode and more particularly to a system and method of rating a stick electrode as to the arc maintaining characteristic of the electrode as determined by open circuit voltage.

2. Discussion of Art

Welding systems use stick electrodes that may vary in quality depending on many variables. For example only, a stick electrode may vary in quality because of handling and or storage of the electrode by an end user. It would therefore be desirable to develop a system and method to rate an electrode so the quality of the electrode is known before use.

BRIEF DESCRIPTION

A system and method of rating the arc maintainability of an electric arc welding stick electrode by creating an arc between the electrode and a workpiece is disclosed. A stick electrode is moved along the workpiece while maintaining an arc therebetween. Either the current or the voltage is decreased until a point is reached where the arc is extinguished. The open circuit voltage at the point where the arc is extinguished is determined. The electrode is rated based upon at least the open circuit voltage point. For example, in accordance with an embodiment, the open circuit voltage is multiplied by the value of the arc current just before the arc is extinguished to obtain an energy rating number. The energy rating number is used as the rating of the stick electrode.

BRIEF DESCRIPTION OF THE DRAWINGS

Reference is made to the accompanying drawings in which particular embodiments of the invention are illustrated as described in more detail in the description below, in which:

FIG. 6 is a flow chart of the program to perform the method shown in FIGS. 4 and 5;

FIG. 11 is a flow chart of the program to perform the method schematically illustrated in FIGS. 7-10; and, FIG. 12 is a voltage current graph illustrating a simplified embodiment of the method for rating a stick electrode.

DETAILED DESCRIPTION

Figure 1:
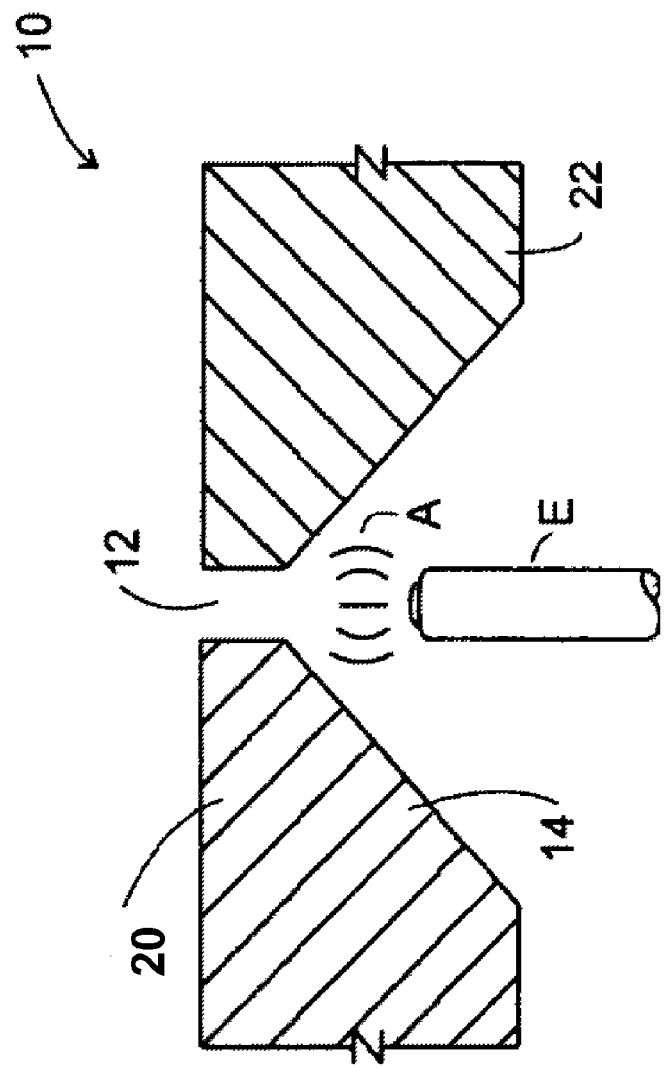
FIG. 1 is an enlarged cross-sectional view showing a system set-up for conducting a method.

Embodiments relate to a system and method of rating a stick electrode. With reference to the drawings, like reference numerals designate identical or corresponding parts throughout the several views. However, the inclusion of like elements in different views does not mean a given embodiment necessarily includes such elements or that all embodiments of the invention include such elements.

A quality characteristic of a stick electrode is its ability to maintain an arc at low heat energy. This is also expressed as a low open circuit voltage. Indeed, this characteristic of maintaining an arc at low energy is more critical in an electrode which contains a fluxing system, because such system affects the arc stability and makes it more difficult to maintain an arc or plasma at a high arc length. The system and method relate to rating a stick electrode having an outside coating with a flux system, such as a rutile fluxing system.

Figure 2:
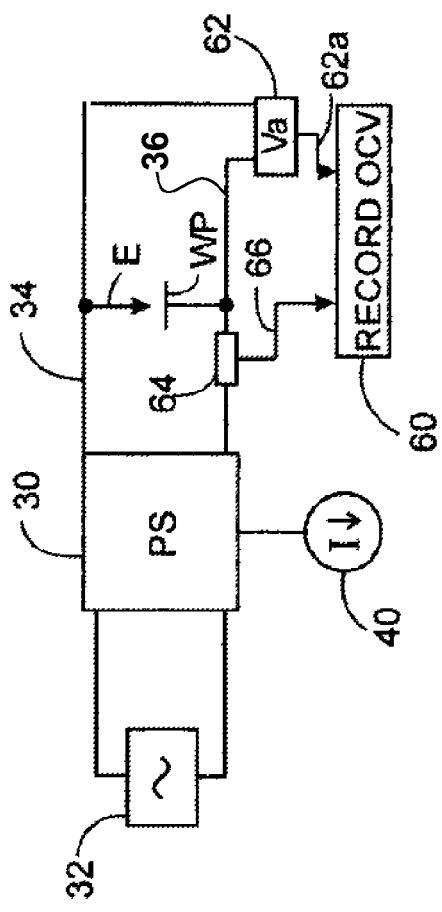
FIGS. 2 and 3 are schematic wiring diagrams of power sources used in performing two different embodiments of the method and system.
Figure 3:
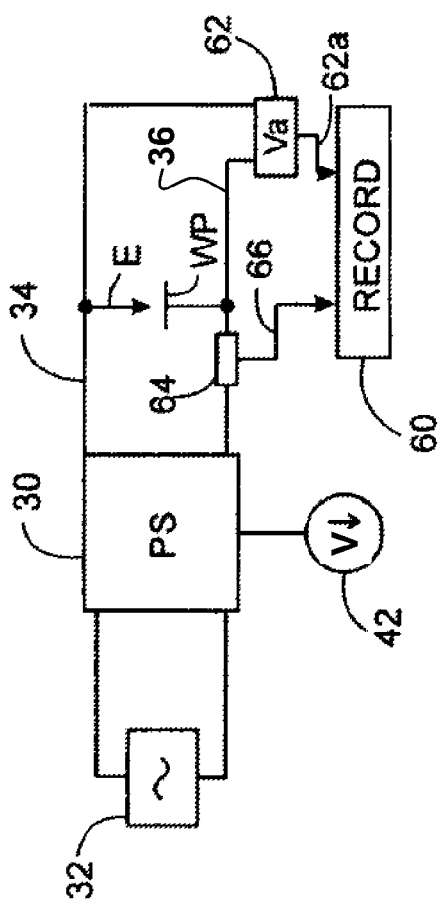

The system and method relate to rating a stick electrode E for its ability to maintain an arc at low voltages and/or low currents. This is also expressed as low wattage and/or low power. The rating fixture or set-up 10 involves an elongated simulating pipe joint defined by gap 12 and upper groove 14 formed by two spaced plates 20, 22 representing pipe sections. Stick electrode E is schematically illustrated in FIGS. 1-3 and includes an integral fluxing system, e.g., a rutile fluxing system. Set-up fixture 10 is used to rate the arc maintaining capabilities of stick electrode E, which ability is an important quality characteristic of a stick electrode used in manual welding. Rating a stick electrode involves the ability of the electrode to maintain arc A as the voltage or current is decreased in a manner schematically illustrated in FIG. 2 or when the voltage is decreased as shown in FIG. 3. These two figures each illustrate a standard power source 30 driven by power supply 32 to create waveforms across output leads 34, 36 connected to electrode E and workpiece WP. In FIG. 2, the power source controller includes the capability of decreasing, in gradual increments, the arc current and recording such decrements as indicated by device 40. In a like manner, as shown in FIG. 3, the controller of power source 30 includes a device 42 for decreasing gradually and recording changes in voltage. Devices 40, 42 of FIGS. 2 and 3, respectively, are used in performing different embodiments of the system and method.

Figures 4, 5:
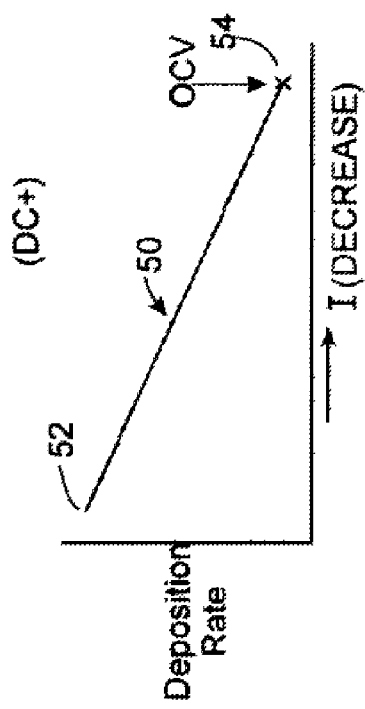
FIG. 4 is a graph illustrating performance of the method, primarily when the welding is DC positive and where rating is accomplished by decreasing the arc current.
FIG. 5 is a table tabulating the results of the test performed in accordance with FIG. 4.

In accordance with an embodiment, when welding in DC positive, the testing procedure set forth in FIG. 4 is normally employed wherein device 40 gradually decreases the arc current so a deposition rate decreases along curve 50 from a high starting point 52. As electrode E is moved along groove 14 for welding in the joint between plates 20, 22, device 40 continues to decrease the welding current until arc A is extinguished at OCV point 54. At that point, the open circuit voltage of power source 30 is recorded. This is accomplished by device 60 shown in FIG. 2 wherein the arc voltage is detected by circuit 62 so that the open circuit voltage at point 54 appears as digital information on outlet line 62*a*. The open circuit condition is sensed by shunt 64, which indicates zero current in line 66 when the arc has been extinguished at point 54. Thus, at point 54 recording device 60, e.g., a program or circuit, records a digital number indicative of the open circuit voltage at point 54. As shown in column 72 the area of the particular electrodes being rated is recorded. In another embodiment, more than one electrode of each type is tested by the method shown in FIG. 4. The number in column 72 is the average open circuit voltage OCV for all electrodes of a given type being rated. Thus, the rating of an electrode is the average open circuit voltage OCV, which average number or value is exhibited in column 74. The number, in digital format, is used for expressing the arc stability characteristic of electrode E as rated by the present method. This rating method is performed by program 80 shown in the flow chart of FIG. 6. In this program the electrode to be rated is selected as step 82. The arc current is decremented, as shown in FIG. 2 and represented by step 84. When the point 54 has been reached, the open circuit voltage is identified and recorded by device or program 60, which constitutes step 86. In one embodiment, this concludes the actual rating procedure. In another embodiment, several electrodes are processed to obtain an average open circuit voltage. This is indicated at step 90 wherein several electrodes A are processed to obtain several points 54. The total value of the several values for the open circuit voltage at points 54 of the electrodes is averaged as indicated in FIG. 5, and represented at step 92 in FIG. 6. Program 80 assigns a rating number to the electrode as indicated at step 94. This rating number is recorded in column 74 of FIG. 5 to evaluate the arc maintaining capabilities of various competitive electrodes. The method may use the machine of FIG. 2 to perform the procedures illustrated in FIGS. 4-6; however, other methods can be used for determining the low energy arc stability of a stick electrode.

Figure 6A:
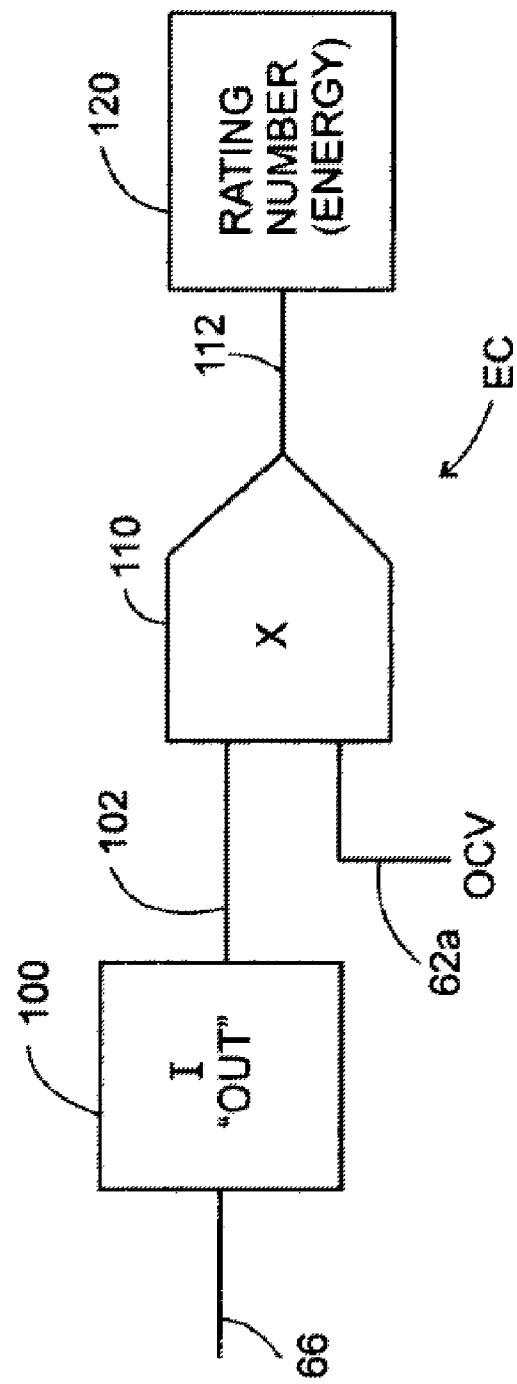
FIG. 6a is a schematic of a circuit for determining and recording current and voltage.

Converting the open circuit voltage value at point 54 into an energy rating number is accomplished by circuit EC in FIG. 6A. Circuit EC is used to determine and record the combination of the current and open circuit voltage when the arc is extinguished at point 54. The lowest energy required to maintain an arc is determined by circuit EC where the current on line 66 is directed to a holding circuit 100, so output line 102 has a number representing the current at point 54. This number is one input to multiplier 110. The other input is a number representing the open circuit voltage at point 54. The second number appears on line 62*a*. These two numbers or values are multiplied to provide a watt calculation on line 112. This calculation gives a digital number referred to as the "energy" rating number and it is recorded in register 120. Thus, after performing the rating method illustrated in FIG. 4, resulting data from FIG. 2 is processed by circuit EC to give an energy rating for electrode E. The electrode will lose its welding arc at an energy below the energy recorded in register 120. This recorded number is a stability characteristic of electrode E. It indicates the ability to withstand large arc lengths and deviations in arc current. The rating method is described in FIG. 4 and an evaluation technique for this data is performed by circuit EC of FIG. 6A.

Figure 7:
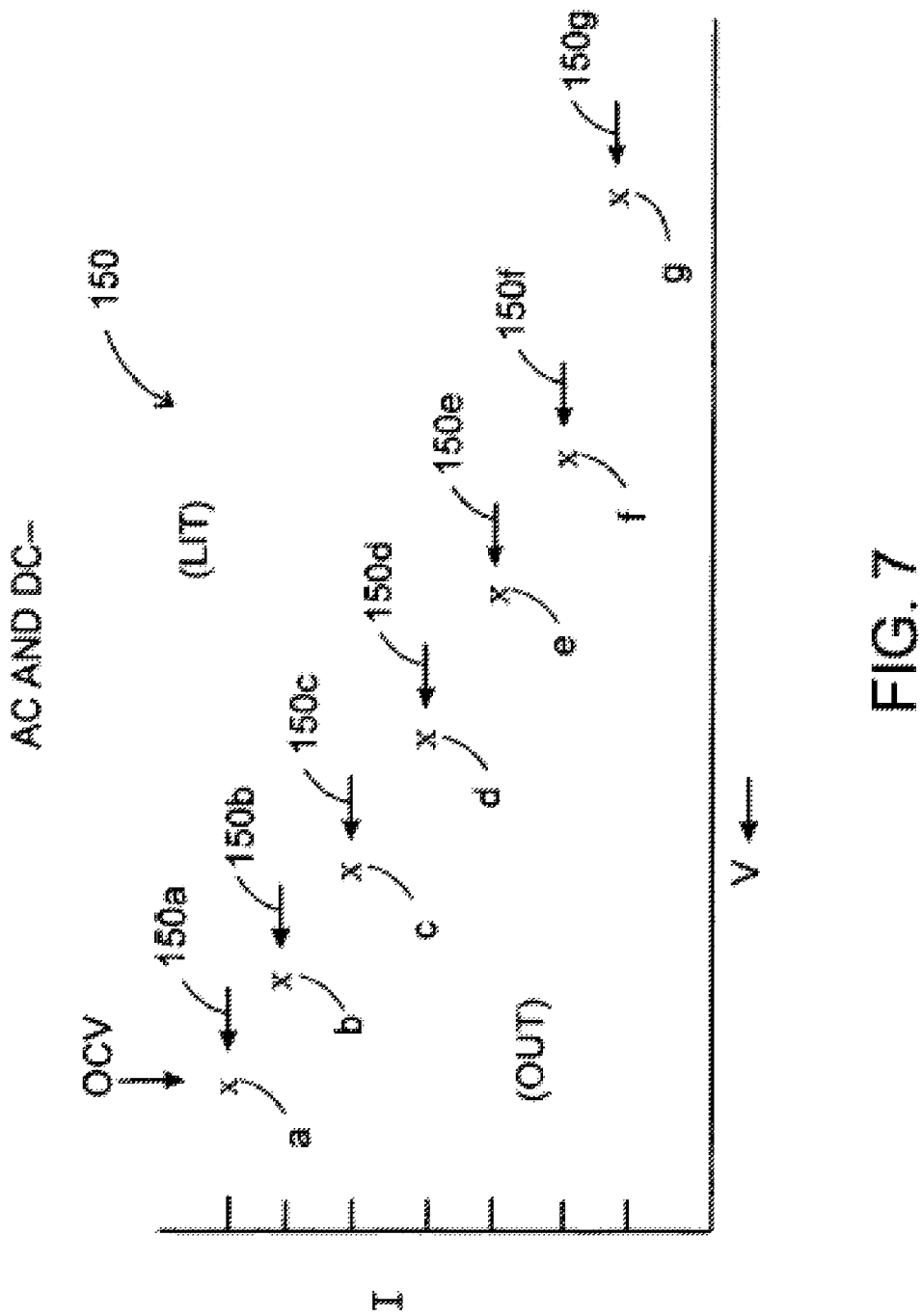
FIG. 7 is a graph illustrating another embodiment utilizing a constant current concept for AC and DC positive welding, wherein OCV points are located for use in plotting a curve representing the characteristics of a stick electrode.

Another embodiment for rating a stick electrode by the power or energy that will no longer sustain an arc is illustrated in FIGS. 7-11. This embodiment is especially applicable for AC welding and DC negative welding and uses the machine schematically shown in FIG. 3. This machine has the features of the machine in FIG. 2 with device 42 for incrementally reducing the welding voltage while maintaining the welding current constant. This embodiment of the invention is schematically illustrated in FIG. 7 where the rating method generates graph 150. This graph is created by holding the welding current constant at a given value and then decreasing the arc voltage by device 42. The arc voltage is directed to program or device 60 from voltage detector 62 on line 62*a*. A series of procedures are performed in rating electrode E. These procedures each involve holding the arc current constant and reducing the arc voltage until the arc energy does not sustain the plasma column or arc. These procedures are shown as separate procedures 150*a*-150*g* to determine the points a-g at which the energy of the arc is insufficient to maintain the arc. Consequently, at each current of the procedures 150*a*-150*g* an open circuit voltage point a-g is determined. These points are plotted as curve 200 of FIG. 8 for electrode E1. This curve is plotted by using the data created by the method described in FIG. 7. Testing of electrode E1 generates data points to plot curve 200. Other electrodes E2, E3 are processed by the method in FIG. 7 to plot curve 202 and curve 204, respectively. These curves have an integrated area 210 under the curve, which area encompasses all energy levels where the electrode cannot sustain an arc. Each energy level is a product of current and voltage and is the same as the output of circuit EC shown in FIG. 6A. Consequently, the area under the curves determine the quality characteristic of each electrode. The area represents the ability to sustain a welding arc at low energy levels. Areas A1, A2 and A3 are set forth in column 222 of table 220 as they relate to and correlate with electrodes E1, E2 and E3 in column 222 of table 220. The evaluation of the electrodes as compared to each other is the numerical value established by the area under the curve shown in FIG. 8 and is recorded on table 220 in FIG. 9. In another rating procedure using calculated areas, the different electrodes are compared by a program performing the algorithm of the conversion chart 230 in FIG. 10. Several electrodes are processed in accordance with the method in FIG. 7 to establish the area under the plotted curve, as disclosed in FIG. 8. The summation of all of these areas for a given electrode is then divided by the number of electrodes tested. This data manipulation generates a digital number recorded in column 236 of chart 230. The recorded number relates to the electrodes in column 232 by executing the intermediate calculation in column 234. The relative quality of the individual electrodes is the number in column 224 of table 220 or the number in column 236 of conversion chart 230. This rating technique or method is performed, using the basic concept shown in FIG. 4 as further set forth and modified in FIG. 7.

Figure 8:
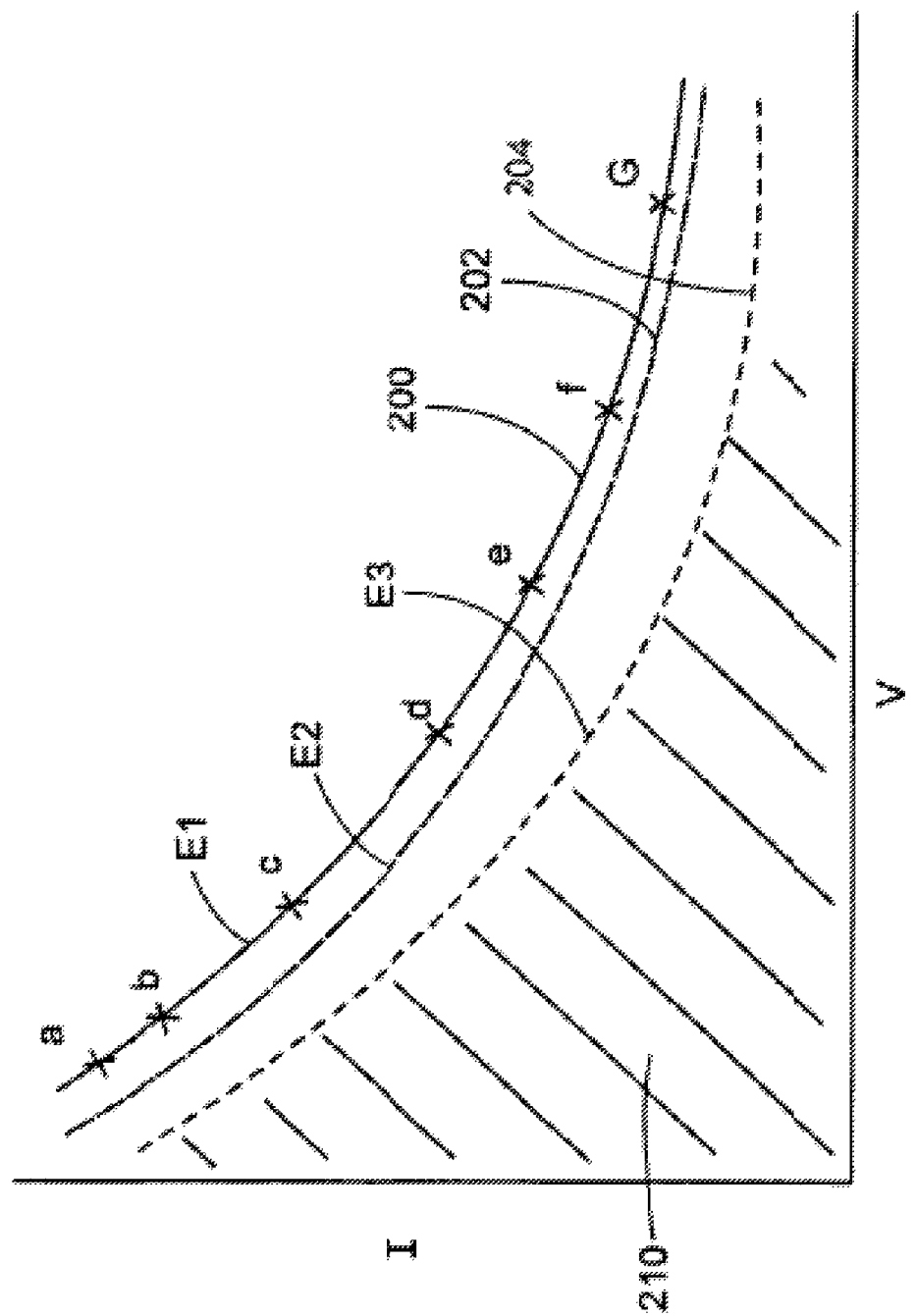
FIG. 8 is a graph of voltage versus current for several different stick electrodes using an analysis of the results as illustrated in FIG. 7.
Figure 9:
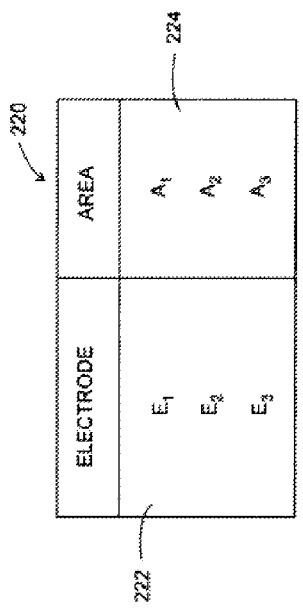
FIG. 9 is a table tabulating the results of the rating procedure and method of FIGS. 7 and 8.
Figure 10:
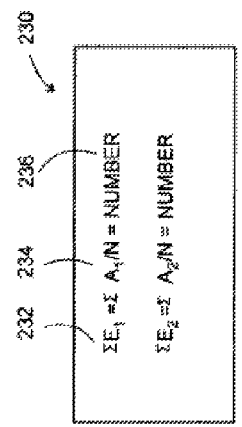
FIG. 10 is a table tabulating a further analysis step as described in FIGS. 7-9.

A flow chart of program 300 for the embodiment shown in FIG. 7 is shown in FIG. 11. Step 302 involves selecting the electrode to be evaluated. At step 304, a constant current is maintained at one of the several procedures set forth in FIG. 7. At step 306, the arc voltage is decreased by device 42 shown in FIG. 3 to create one of the "out" points a-g of graph 150. As illustrated in FIG. 8, step 310 involves plotting the curves 200, 202 or 204 based upon the determined open circuit points a-g. At step 312, the area under a curve is calculated by an algorithm, as explained in connection with table 220. This process step assigns a rating number at step 314. This rating number is either the area of column 224 in FIG. 9 or the calculated number for the average area in column 236 of FIG. 10. FIGS. 7-10 illustrate the basic concept of reducing either the current or the voltage to determine the open circuit voltage or the point in which the arc energy will not sustain an arc. This determination of the open circuit voltage or arc sustaining energy is expressed in an assigned number to rate the quality of the electrode. In alternative embodiments, there are other processes for employing the concept of measuring the sustaining power or energy of the arc for a given electrode to rate an electrode.

Figure 12:
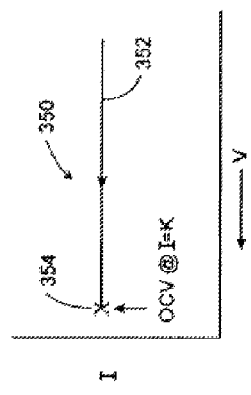

The procedure in FIG. 4 is a single procedure wherein the current is reduced until the arc plasma is no longer sustained. This same simple one step procedure is used many times in the rating method of FIG. 7. This one step concept is schematically shown in FIG. 12 wherein procedure 350 is like one of the several procedures 150a-150g. The arc current is held constant at a value K and the arc voltage is reduced along line 352 until the arc is extinguished at point 354. This is the method of FIG. 4, but using voltage. These procedures determine the wattage, or more simply the open circuit voltage, at which the arc is no longer sustainable. This value is used in determining the quality of a stick electrode.

In summary, an embodiment of the present invention comprises a method of representing arc maintainability of an electric arc welding stick electrode for depositing molten metal from the electrode onto a workpiece by using an arc between the electrode and the workpiece, wherein the arc is caused by a voltage from a power source where the voltage creates a current of the arc. In accordance with an embodiment, the stick electrode has an outer coating containing a fluxing system, and the fluxing system is rutile based. The method includes creating the arc between the electrode and the workpiece and moving the electrode along the workpiece while maintaining the arc. The method further includes decreasing either the current or the voltage until a point is reached where the arc is extinguished, wherein the point corresponds to an open circuit voltage, and wherein the open circuit voltage is the voltage at the point where the arc is extinguished with a zero current value which corresponds to the current of the arc at the point where the arc is extinguished. The method also includes determining an open circuit voltage of the power source at the point where the arc is extinguished and rating the electrode by multiplying the open circuit voltage by a current of the arc just before reaching the point where the arc is extinguished to obtain an energy rating number. The step of decreasing may relate to the current of the arc or the voltage of the arc. The voltage may be one of a DC positive voltage, a DC negative voltage, or an AC voltage. The rating step may further include obtaining the point for N electrodes, adding the energy rating numbers of the N points to obtain a total, and using the total to rate the electrodes. The total may be divided by N before being used to rate the electrodes, in accordance with an embodiment.

Another embodiment of the present invention comprises a system. The system includes a power source, an electrode and a workpiece, and output leads electrically connecting the power source to the electrode and the workpiece. The system also includes an arc voltage detecting circuit, an open circuit detecting circuit, and a power source controller. The system further includes a recorder configured to record at least an open circuit voltage, wherein the open circuit voltage is the voltage at a point where the arc between the electrode and the workpiece is extinguished. The system also includes an energy circuit that determines an energy rating number for the electrode based on the open circuit voltage and an arc current. The current is determined just before a point where the arc is extinguished. In accordance with an embodiment, the power source controller is configured to decrease an arc current in gradual increments and the recorder is configured to record the arc current. The recorder is configured to record the arc current at a point just before the arc is extinguished, and the electrode is rated based upon the open circuit voltage and the arc current. In accordance with an embodiment, the power source controller is configured to decrease a voltage in gradual increments and the recorder is configured to record the voltage. In accordance with an embodiment, the energy rating number may be graphically represented in at least one curve, and an area under the at least one curve may be used as a quality rating for the electrode.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method of representing arc maintainability of an electric arc welding stick electrode for depositing molten metal from said electrode onto a workpiece by using an arc between said electrode and said workpiece, said arc caused by a voltage from a power source where said voltage creates a current of said arc, said method comprising:
   creating said arc between said electrode and said workpiece;
   moving said electrode along said workpiece while maintaining said arc;
   decreasing said voltage until a point is reached where said arc is extinguished wherein said point corresponds to an open circuit voltage, and wherein said open circuit voltage is the voltage at said point where said arc is extinguished with a zero current value which corresponds to said current of said arc at said point where said arc is extinguished;
   determining said open circuit voltage of said power source at said point where said arc is extinguished; and
   rating said electrode by multiplying said open circuit voltage by a current of said arc just before reaching said point where said arc is extinguished to obtain an energy rating number.

2. The method as defined in claim 1 wherein said voltage is DC positive.

3. The method as defined in claim 1 wherein said voltage is DC negative.

4. The method as defined in claim 1 wherein said voltage is AC.

5. The method as defined in claim 1 wherein said rating includes:
   obtaining N points corresponding to arc extinguishment for N electrodes including said electrode;
   rating said N electrodes based on said N points to obtain N energy rating numbers including said energy rating number;
   adding the N energy rating numbers of said N points to obtain a total sum of the energy rating numbers; and
   using said total to rate said N electrodes.

6. The method as defined in claim 5 wherein said total is divided by N before being used to rate said N electrodes.

7. The method as defined in claim 1 including:
   reducing said voltage for each of several arc currents whereby said points create a plotted curve;
   calculating an area below said plotted curve; and,
   calculating a supplemental rating for said electrode based upon said calculated area.

8. The method as defined in claim 1 wherein said stick electrode has an outer coating containing a fluxing system.

9. The method as defined in claim 8 wherein said fluxing system is rutile based.

10. The method as defined in claim 1 including calculating a supplemental rating for said electrode based upon said open circuit voltage.

11. A method of representing arc maintainability of an electric arc welding stick electrode for depositing molten metal from said electrode onto a workpiece by using an arc between said electrode and said workpiece, said arc caused by a voltage from a power source where said voltage creates a current of said arc, said method comprising:
   creating said arc between said electrode and said workpiece;
   moving said electrode along said workpiece while maintaining said arc;
   decreasing said current until a point is reached where said arc is extinguished wherein said point corresponds to an open circuit voltage, and wherein said open circuit voltage is the voltage at said point where said arc is extinguished with a zero current value which corresponds to said current of said arc at said point where said arc is extinguished;
   determining said open circuit voltage of said power source at said point where said arc is extinguished; and
   rating said electrode by multiplying said open circuit voltage by a current of said arc just before reaching said point where said arc is extinguished to obtain an energy rating number.

12. The method as defined in claim 11 wherein said voltage is DC positive.

13. The method as defined in claim 11 wherein said voltage is DC negative.

14. The method as defined in claim 11 wherein said voltage is AC.

15. The method as defined in claim 11 wherein said rating includes:
   obtaining N points corresponding to arc extinguishment for N electrodes including said electrode; rating said N electrodes based on said N points to obtain N energy rating numbers including said energy rating number; adding the N energy rating numbers of said N points to obtain a total sum of the energy rating numbers; and using said total to rate said N electrodes.

16. The method as defined in claim 15 wherein said total is divided by N before being used to rate said electrodes.

* * * * *